United States Patent [19]

Asada

[11] Patent Number: 5,049,116
[45] Date of Patent: Sep. 17, 1991

[54] AUTOMATIC PLANETARY GEAR TRANSMISSION

[75] Inventor: Toshiyuki Asada, Susono, Japan

[73] Assignee: Toyota Jidosha Kabushiki Kaisha, Toyota, Japan

[21] Appl. No.: 439,699

[22] Filed: Nov. 21, 1989

[30] Foreign Application Priority Data

Dec. 7, 1988 [JP] Japan ................... 63-307936

[51] Int. Cl.⁵ ............................... F16H 3/62
[52] U.S. Cl. ............................. 475/269; 475/280; 475/278
[58] Field of Search ............... 475/269, 280, 282, 284, 475/286, 288, 290, 330

[56] References Cited

U.S. PATENT DOCUMENTS

| | | | |
|---|---|---|---|
| 2,911,853 | 11/1959 | Sand . | |
| 3,971,267 | 7/1976 | Murakami et al. | 74/759 |
| 4,089,238 | 5/1978 | Forster et al. | 74/759 |
| 4,233,861 | 11/1980 | Gaus et al. | 74/763 |
| 4,660,439 | 4/1987 | Hiraiwa | 74/763 |
| 4,939,955 | 7/1990 | Sugano | 475/278 |
| 4,963,124 | 10/1990 | Takahashi et al. | 475/278 |

FOREIGN PATENT DOCUMENTS

| | | | |
|---|---|---|---|
| 1530599 | 10/1969 | Fed. Rep. of Germany . | |
| 2141354 | 8/1971 | Fed. Rep. of Germany . | |
| 2406124 | 10/1974 | Fed. Rep. of Germany . | |
| 2751312 | 6/1978 | Fed. Rep. of Germany | 475/280 |
| 50-32913 | 10/1975 | Japan . | |
| 51-3012 | 1/1976 | Japan . | |
| 51-17767 | 2/1976 | Japan . | |
| 51-48062 | 4/1976 | Japan . | |
| 51-108168 | 9/1976 | Japan . | |
| 51-108170 | 9/1976 | Japan . | |
| 51-127968 | 11/1976 | Japan . | |
| 52-18571 | 2/1977 | Japan . | |
| 53-123762 | 10/1978 | Japan | 475/284 |
| 61-45139 | 3/1986 | Japan . | |

Primary Examiner—Allan D. Herrmann
Assistant Examiner—William O. Trousdell
Attorney, Agent, or Firm—Cushman, Darby & Cushman

[57] ABSTRACT

A speed changing gear device for a motor vehicle, including a first and a second single-pinion type planetary gear unit and a third double-pinion planetary gear unit, which are coaxially disposed so as to provide different speed reduction ratios. The three gear units have respective first, second and third sun gears, respective first, second and at least one pair of planetary pinions, respective first, second and third ring gears, and respective first, second and third carriers. The first and third ring gears are fixed to each other for rotation as a unit, or connectable to each other by clutch means. The first sun gear and the second ring gear are fixed to each other or connectable by clutch means. The second and third carriers are fixed to each other or connectable to each other by clutch means. The second and third sun gears are fixed to each other or connectable by clutch means.

4 Claims, 13 Drawing Sheets

Fig. 1b.

| | CLUTCHES | | | BRAKES | | | SPEED REDUCTION RATIO | |
|---|---|---|---|---|---|---|---|---|
| | K1 | K2 | K3 | B1 | B2 | B3 | ($\rho_1 = 0.317$, $\rho_2 = 0.379$, $\rho_3 = 0.320$) | |
| 1st | O | | O | O | | | $(\rho_2 + \rho_3)/(\rho_3 - \rho_1 \rho_2)$ | 3.498 |
| 2nd | O | | O | | O | | $(\rho_2 + \rho_3)/\rho_3$ | 2.184 |
| 3rd | O | | O | | | O | $1 + \rho_2$ | 1.379 |
| 4th | | O | O | | | | 1 | 1.000 |
| 5th | O | O | | | | O | $\dfrac{1 + \rho_1 + \rho_1 \rho_2 - \rho_3}{1 + \rho_1}$ | 0.848 |
| 6th | | O | O | | | O | $1 - \rho_3$ | 0.680 |
| 7th | | O | O | | O | | $\rho_1(\rho_2 + \rho_3)/\rho_3(1 + \rho_1)$ | 0.526 |
| R | O | | | O | | O | $-(1 - \rho_3)/\rho_1$ | -2.145 |

|  | CLUTCHES | | | | BRAKES | | |
|---|---|---|---|---|---|---|---|
|  | K1 | K2 | K3 | K4 | B1 | B2 | B3 |
| 1st | ○ | | ○ | | ○ | | |
| 2nd | ○ | | ○ | | | ○ | |
| 3rd | ○ | | ○ | | | | ○ |
| 4th | ○ | ○ | ○ | | | | |
| 5th | | ○ | ○ | | | | ○ |
| 6th | ○ | ○ | | | | | ○ |
| 7th | | ○ | ○ | | | ○ | |
| R1 | ○ | | | | ○ | | ○ |
| R2 | ○ | | | ○ | ○ | | |

|  | CLUTCHES | | | BRAKES | | |
|---|---|---|---|---|---|---|
|  | K1 | K2 | K5 | B1 | B2 | B3 |
| 1st | O |  | O | O |  |  |
| 2nd | O |  | O |  | O |  |
| 3rd | O |  | O |  |  | O |
| 4th | O | O | O |  |  |  |
| 5th |  | O | O |  |  | O |
| 6th | O | O |  |  |  | O |
| 7th |  | O | O |  | O |  |
| R | O |  |  | O |  | O |

|  | CLUTCHES | | | | BRAKES | | |
|---|---|---|---|---|---|---|---|
|  | K1 | K2 | K4 | K5 | B1 | B2 | B3 |
| 1st | O |  |  | O | O |  |  |
| 2nd | O |  |  | O |  | O |  |
| 3rd | O |  |  | O |  |  | O |
| 4th | O | O |  | O |  |  |  |
| 5th |  | O |  | O |  |  | O |
| 6th | O | O |  |  |  |  | O |
| 7th |  | O | O |  |  | O |  |
| R1 | O |  |  |  | O |  | O |
| R2 | O |  |  | O | O |  |  |

|  | CLUTCHES | | | BRAKES | | |
|---|---|---|---|---|---|---|
|  | K1 | K3 | K6 | B1 | B2 | B3 |
| 1st | O | O |  | O |  |  |
| 2nd | O | O |  |  | O |  |
| 3rd | O | O |  |  |  | O |
| 4th | O | O | O |  |  |  |
| 5th | O |  | O |  |  | O |
| R | O |  |  | O |  | O |

|  | CLUTCHES |  |  |  | BRAKES |  |  |
|---|---|---|---|---|---|---|---|
|  | K1 | K3 | K4 | K6 | B1 | B2 | B3 |
| 1st | O | O |  |  | O |  |  |
| 2nd | O | O |  |  |  | O |  |
| 3rd | O | O |  |  |  |  | O |
| 4th | O | O |  | O |  |  |  |
| 5th | O |  |  | O |  |  | O |
| R1 | O |  |  |  | O |  | O |
| R2 | O |  | O |  | O |  |  |

|  | CLUTCHES | | BRAKES | | |
| --- | --- | --- | --- | --- | --- |
|  | K3 | K6 | B1 | B2 | B3 |
| 1st | O |  | O |  |  |
| 2nd | O |  |  | O |  |
| 3rd | O |  |  |  | O |
| 4th | O | O |  |  |  |
| 5th |  | O |  |  | O |
| R |  |  | O |  | O |

|  | CLUTCHES ||| BRAKES |||
|---|---|---|---|---|---|---|
|  | K3 | K4 | K6 | B1 | B2 | B3 |
| 1st | O |  |  | O |  |  |
| 2nd | O |  |  |  | O |  |
| 3rd | O |  |  |  |  | O |
| 4th | O |  | O |  |  |  |
| 5th |  |  | O |  |  | O |
| R1 |  |  |  | O |  | O |
| R2 |  | O |  | O |  |  |

|     | CLUTCHES | | | BRAKES | | |
| --- | --- | --- | --- | --- | --- | --- |
|     | K1 | K5 | K6 | B1 | B2 | B3 |
| 1st | O | O |   | O |   |   |
| 2nd | O | O |   |   | O |   |
| 3rd | O | O |   |   |   | O |
| 4th | O | O | O |   |   |   |
| 5th | O |   | O |   |   | O |
| R   | O |   |   | O |   | O |

|  | CLUTCHES | | BRAKES | | |
|---|---|---|---|---|---|
|  | K5 | K6 | B1 | B2 | B3 |
| 1st | O |  | O |  |  |
| 2nd | O |  |  | O |  |
| 3rd | O |  |  |  | O |
| 4th | O | O |  |  |  |
| 5th |  | O |  |  | O |
| R |  |  | O |  | O |

|  | CLUTCHES | | | | BRAKES | | |
|---|---|---|---|---|---|---|---|
|  | K1 | K4 | K5 | K6 | B1 | B2 | B3 |
| 1st | ○ |  | ○ |  | ○ |  |  |
| 2nd | ○ |  | ○ |  |  | ○ |  |
| 3rd | ○ |  | ○ |  |  |  | ○ |
| 4th | ○ |  | ○ | ○ |  |  |  |
| 5th | ○ |  |  | ○ |  |  | ○ |
| R1 | ○ |  |  |  | ○ |  | ○ |
| R2 | ○ | ○ |  |  | ○ |  |  |

|  | CLUTCHES | | | BRAKES | | |
|---|---|---|---|---|---|---|
|  | K4 | K5 | K6 | B1 | B2 | B3 |
| 1st |  | ○ |  | ○ |  |  |
| 2nd |  | ○ |  |  | ○ |  |
| 3rd |  | ○ |  |  |  | ○ |
| 4th |  | ○ | ○ |  |  |  |
| 5th |  |  | ○ |  |  | ○ |
| R1 |  |  |  | ○ |  | ○ |
| R2 | ○ | ○ |  | ○ |  |  |

AUTOMATIC PLANETARY GEAR TRANSMISSION

BACKGROUND OF THE INVENTION

1. Field of the Invention

The present invention relates in general to a speed changing gear device in an automatic transmission for motor vehicles such as automobiles and railway carriages, and more particularly to such a speed changing gear device which is equipped with two single-pinion type planetary gear units and one double-pinion type planetary gear unit.

2. Discussion of the Prior Art

A known speed changing gear device used in an automatic transmission for a motor vehicle has a plurality of suitably assembled planetary gear units, each of which has a sun gear, a ring gear, at least one planetary pinion meshing with the sun and ring gears, and a carrier rotatably supporting the planetary pinion or pinions. One of these gears and carriers (pinions) of the planetary gear units serves as an input element which is connected to an input member of the transmission, and another element of the gear device serves as an output element which is connected to an output member of the transmission, while other elements may be fixed to a stationary member such as a transmission casing. In this arrangement, a rotary motion of the input member of the transmission is transmitted to the output member, at different speed reduction ratios, for forward or reverse running of the vehicle.

The speed reduction ratios provided by the speed changing gear device as described above vary to a considerable extent, depending upon the manner of assembling or connecting the planetary gear units, the gear ratio of each planetary gear unit (i.e., number of teeth of the sun gear divided by number of teeth of the ring gear), and the number of the planetary pinions each planetary gear unit has. However, not all conceivable configurations of the planetary gear device are practically usable. Namely, the speed changing gear device having a series of planetary gear units can be practically adopted if the gear device satisfies various conditions or limitations, such as installation adaptability to the vehicle body, feasibility of production, and power transmitting and speed changing characteristics and performance. In other words, numerous types of planetary gear devices can be constructed by merely changing the combination and the gear ratios of the planetary gear units. Therefore, it is rather difficult to figure out the speed changing gear device which satisfies all the conditions indicated above required for an automatic transmission for a motor vehicle.

Various types of speed changing gear devices suited for use in the automatic transmission have been proposed under the situation as described above. For example, laid-open Publications Nos. 51-17767, 51-48062, 51-108168, 51-108170 and 51-127968 of unexamined Japanese Patent Applications disclose speed changing planetary gear devices having three planetary gear units.

In the speed changing gear device having a plurality of planetary gear units, however, the number of operating positions provided by the gear device and the speed reduction ratios of the respective operating positions are greatly variable, depending upon how the planetary gear units are connected to each other, which element of the gear device is connected to the input member of the transmission and which elements are made fixable to a stationary member. Practically, a suitable speed changing gear device for a vehicle transmission is selected based on the output characteristic of the engine to which the transmission is connected, and the type and required characteristics of the vehicle on which the transmission is installed. If the different types of motor vehicle require speed changing gear devices which are differently constructed in the gear train arrangement of the planetary gear units, as well as in the location of the clutches and brakes, the number of the types of the gear devices that should be prepared is as large as that of the types of the motor vehicles on which the gear devices are installed. This results in poor productivity of the gear devices due to increased time for designing and manufacturing thereof. Namely, there should be prepared many basic arrangements of planetary gear assembly, which cannot enjoy common manufacturing or assembling steps, and the productivity of the necessary line of gear devices is accordingly lowered.

As described above, the speed changing gear device having a plurality of planetary gear units is capable of establishing a plurality of speed reduction ratios, which largely differ depending on the manner of connecting the planetary gear units and the locations of the clutches and the brakes in the planetary gear assembly. Therefore, it is technically possible to determine the number of operating positions and the speed reduction ratios of the gear device as needed, by changing the numbers and locations of the clutches for receiving power from the engine and the brakes for holding stationary the selected elements of the gear device, while maintaining the same combinations of elements of the planetary gear units which are permanently fixed together, or connectable to each other by clutch means. In this way, the problem described above can be solved to some degree since the same basic arrangement of the planetary gear assembly may be used for different configurations of the gear devices. In this case, it is desirable that the basic arrangement of the planetary gear assembly is made relatively compact and small-sized, and easy to manufacture, and provides the speed reduction ratios which vary substantially in the form of a geometric progression, for reducing shifting shocks. It is also desirable that the basic arrangement provides a relatively wide range of speed reduction ratios, which includes a speed reduction ratio of "1" or lower as needed.

On the other hand, the conventional speed changing gear devices as disclosed in the above-identified publications are not able to establish an overdrive position whose speed reduction ratio is "1" or lower. Further, these publications do not show the manner of changing the arrangement of the clutches and brakes so as to change the operating positions provided by the gear devices. In the conventional gear devices, the speed reduction ratios of the operating positions do not always change in the form of a geometric progression, thereby unfavorably inducing the shifting shocks, which deteriorate the driving comfort of the vehicle.

SUMMARY OF THE INVENTION

The present invention was developed in the light of the situations described above. It is accordingly an object of the invention to provide a speed changing gear device in an automatic transmission for a motor vehicle, which has a basic arrangement including a plurality of planetary gear units, so that the arrangement permits easy modifications to provide different specific configurations which suit composite requirements of different types of automatic transmission of the vehicle.

The above object may be attained according to the principle of the present invention, which provides a speed changing gear device in an automatic transmission for a motor vehicle, including a first single-pinion type planetary gear unit having a first sun gear, a first planetary pinion meshing with the first sun gear, a first ring gear meshing with the first planetary pinion and a first carrier rotatably supporting the first planetary pinion, a second single-pinion type planetary gear unit having a second sun gear, a second planetary pinion meshing with the second sun gear, a second ring gear meshing with the second planetary pinion and a second carrier rotatably supporting the second planetary pinion, and a third double-pinion type planetary gear unit having a third sun gear, at least one pair of third planetary pinions which mesh with each other and one of which meshes with the third sun gear, a third ring gear meshing with the other of the above-indicated at least one pair of third planetary pinions, and a third carrier rotatably supporting the above-indicated at least one pair of third planetary pinions, the first, second and third planetary gear units being disposed coaxially with each other in the order of description, for transmitting power from an input member to an output member, at a selected one of different speed reduction ratios, the present speed changing gear device being characterized in that the ring gears of the first and third planetary gear units are fixed to each other, or connectable to each other through clutch means, that the sun gear of the first planetary gear unit and the ring gear of the second planetary gear unit are fixed to each other, or connectable to each other through clutch means, that the carriers of the second and third planetary gear units are fixed to each other, or connectable to each other through clutch means, and that the sun gears of the second and third planetary gear units are fixed to each other, or connectable to each other through clutch means.

Where the two elements indicated above are fixed to each other, these two elements may be separate members secured to each other by a suitable method. Alternatively, the two elements may be formed as a single integral member which attains two functions corresponding to the two elements. In the latter case, too, the two elements are interpreted to be fixed to each other by fixing means, according to the principle of the present invention. The clutch means indicated above may be a clutch which is engaged for selectively connecting the appropriate two elements indicated above.

In the speed changing device of the present invention constructed as described above, the ring gears of the first and third planetary gear units are always or momentarily rotated or held stationary as a unit, or rotated or held stationary independently of each other, thereby serving as an integral stationary element, separate stationary elements, an integral input element or separate input elements which is/are connected to the input member, or an integral output element or separate output elements which is/are connected to the output member. Similarly, the sun gear of the first planetary gear unit and the ring gear of the second planetary gear unit serve as the integral stationary element or separate stationary elements, the integral input element or separate input elements, or the integral output element or separate output elements. Further, the carriers of the second and third planetary gear units serve as the integral stationary element or separate stationary elements, the integral input element or separate input elements, or the integral output element or separate output elements. Moreover, the sun gears of the second and third planetary gear units serve as the integral stationary element or separate stationary elements, the integral input element or separate input elements, or the integral output element or separate output elements. Each of the independent elements of the speed changing gear device, such as the carrier of the first planetary gear unit, serves as an independent stationary, input or output element of the device. Thus, the individual planetary gear units cooperate to transmit a rotary motion of the input member of the transmission to the output member, at the different speed reduction ratios (which may include direct drive and/or overdrive ratio or ratios), for forward or reverse running of the vehicle. At least one of the three planetary gear units contributes to establishing the speed reduction ratio of the selected operating position, except for the direct drive position whose speed reduction ratio is equal to "1". The present speed changing gear device may be adapted to provide a relatively large number of operating positions including five to seven forward drive positions and one to two reverse drive positions, permitting stepwise speed changes over a relatively wide range of speed reduction ratio (that is, a relatively high ratio of the highest reduction ratio to the lowest reduction ratio). Further, the speed reduction ratios provided by the gear device may be determined so as to vary substantially in the form of a geometric progression.

The present speed changing gear device incorporating the two single-pinion type planetary gear units and the one double-pinion type planetary gear unit gives a compact automatic transmission which can be readily modified for various applications, and which displays improved power transmitting characteristics, with reduced shifting shocks.

In one form of the invention, clutch means is provided between the first sun gear and the second ring gear for connecting these two elements when needed. In another form of the invention, clutch means is provided for selectively connecting the second and third carriers

BRIEF DESCRIPTION OF THE DRAWINGS

The above and optional objects, features and advantages of the present invention will become more apparent by reading the following detailed description of presently preferred embodiments of the invention, when considered in conjunction with the accompanying drawings, in which:

FIG. 1(b) is a view showing operating positions of the gear device of FIG. 1(a), and on-off states of clutches and brakes of the gear device to establish the positions of the gear device;

FIGS. 2(a), 3, 4, 5(a), 6(a), 7(a), 8(a), 9(a), 10(a), 11(a), 12(a), 13(a) and 14(a) are schematic views corresponding to that of FIG. 1, showing various other embodiments of the invention;

FIGS. 2(b), 3, 4, 5(b), 6(b), 7(b), 8(b), 9(b), 10(b), 11(b), 12(b), 13(b) and 14(b) are views showing operating positions of the gear devices of the embodiments of FIGS. 2(a), 5(a), 6(a), 7(a), 8(a), 9(a), 10(a), 11(a), 12(a), 13(a) and 14(a), respectively, and on-off states of clutches and brakes of the respective gear devices.

DETAILED DESCRIPTION OF THE PREFERRED EMBODIMENTS

Figure 1A:
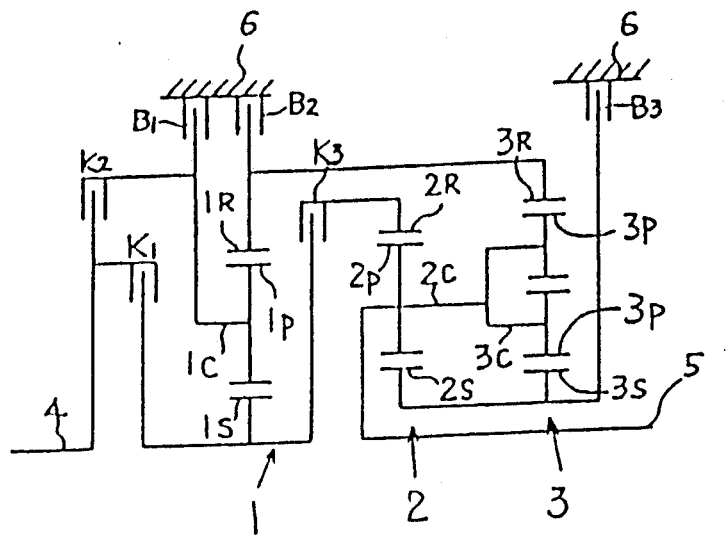
FIG. 1(a) is a schematic view illustrating a part of an automatic transmission which incorporates one embodiment of a speed/, changing gear device of the present invention.

Referring first to FIG. 1(a), there is shown one embodiment of a speed changing gear device used in an automatic transmission for a motor vehicle, which includes a first planetary gear unit 1, a second planetary gear unit 2 and a third planetary gear unit 3. Each of the first and second planetary gear units 1, 2 is a single-pinion type planetary gear assembly, while the third planetary gear unit 3 is a double-pinion type planetary gear assembly.

More specifically described, the first planetary gear unit 1 has a first sun gear 1S, a first planetary pinion 1P, a first carrier 1C and a first ring gear 1R. The first sun gear and ring gear 1S, 1R are disposed in coaxial relation with each other, while the first planetary pinion 1P is rotatably supported by the first carrier 1C and is disposed between and meshes with the first sun gear and ring gear 1S, 1R. The second planetary gear unit 2 has a second sun gear 2S, a second planetary pinion 2P, a second carrier 2C and a second ring gear 2R. The second sun gear and ring gear 2S, 2R are disposed in coaxial relation with each other, while the second planetary pinion 2P are rotatably supported by the second carrier 2C and is disposed between and meshes with the second sun gear and ring gear 2S, 2R.

The third planetary gear unit 3 has a third sun gear 3S, a pair of third planetary pinions 3P which mesh with each other, a third carrier 3C and a third ring gear 3R. The third planetary gear unit 3 may include two or more pairs of third planetary pinions 3P. The pair of third planetary pinions 3P are rotatably supported by the third carrier 3C and are disposed between the third sun gear and ring gear 3S, 3R. One of the two third planetary pinions 3P meshes with the third sun gear 3S, while the other pinion 3P meshes with the third ring gear 3R.

In the speed changing gear device, the first and third ring gears 1R and 3R are fixed to each other for rotation as a unit, while a third clutch K3 is provided between the first sun gear 1S and the second ring gear 2R so that the gears 1S, 2R are connectable to each other by the third clutch K3. Further, the second carrier 2C and the third carrier 3C are fixed to each other for rotation as a unit, while the second sun gear 2S and the third sun gear 3S are fixed to each other for rotation as a unit.

Suitable connecting means is provided between the mutually connected elements as described above. The connecting means may be a hollow shaft, a solid shaft, a connecting drum, or other connecting member that is used in a conventional automatic transmission for a motor vehicle.

An input shaft 4 is connected to an engine (not shown) of the vehicle via suitable power transmission means such as a torque converter and a fluid coupling. Between the input shaft 4 and the first sun gear 1S, there is provided a first clutch K1 for selectively connecting the two members 4, 1S. Further, a second clutch K2 is provided between the input shaft 4 and the first carrier 1C for selective connection therebetween. Each of the first, second and third clutches K1, K2 and K3 may use a wet type multiple-disk clutch or a one-way clutch, or a combination of the multiple-disk clutch and one-way clutch in series or parallel connection with each other. These types of clutches are selectively engaged and disengaged for connecting and disconnecting the appropriate elements with and from each other, by a hydraulically operated servo device or other actuating device that is generally used in the automatic transmission. It will be understood that suitable connecting or intermediate members such as connecting drums may be provided for the clutches K1, K2, K3, for assuring the space within a transmission casing 6 for installation of the elements (gears and carriers) of the three planetary gear units.

The speed changing gear device further incorporates a first brake B1, a second brake B2 and a third brake B3. The first brake B1 is engaged for fixing the first carrier 1C to the transmission casing 6. The second brake B2 is engaged for fixing the first and third ring gears 1R, 3R to the transmission casing 6, while the third brake B3 is engaged for fixing the second and third sun gears 2S, 3S to the transmission casing 6. Each of the brakes B1, B2 and B3 may use a wet type multiple-disk brake, a band brake, a one-way clutch, or a combination thereof. These types of brakes are engaged and released for selectively locking the appropriate elements, by a hydraulically operated servo device or other actuating device that is generally used in the automatic transmission. In practice. suitable connecting means may be provided between the brakes B1, B2, B3 and the corresponding elements to be locked, or between the brakes and the transmission casing 6.

To the second and third carrier 2C, 3C of the second and third planetary gear units 2, 3, there is connected an output shaft 5 which serves to transmit a rotary motion from the gear device or transmission to a propeller shaft or a counter gear (not shown) of a motor vehicle.

The present speed changing gear device constructed as described above has eight operating positions, i.e., seven forward-drive positions (1st-speed, 2nd-speed, 3rd-speed, 4th-speed, 5th-speed, 6th-speed and 7th-speed positions), and one rear-drive position. As indicated in the table of FIG. 1(b), these eight positions are selectively established by simultaneous engagement of three frictional coupling devices selected from the first, second and third clutches K1–K3 and the first, second and third brakes B1–B3. The table shown in FIG. 1(b) also indicates the speed reduction ratios (speed of the input shaft 4/speed of the output shaft 5) of the respective operating positions of the gear device, and their specific values which are obtained in the present embodiment in which the planetary gear units 1, 2, 3 have respective gear ratios $\rho_1 = 0.317$, $\rho_2 = 0.379$ and $\rho_3 = 0.320$. In the table, the engaged clutches and brakes are indicated by "o" marks. There will be described in detail each operating position of the speed changing gear device.

1ST-SPEED FORWARD-DRIVE POSITION

The 1st-speed position of the speed changing gear device is established or selected by concurrent engagement of the first and third clutch K1, K3 and the first brake B1. In this condition, the first sun gear 1S and the second ring gear 2R are connected to the input shaft 4, while the first carrier 1C is fixed to the transmission casing 6. In the first planetary gear unit 1, the first sun gear 1S is rotated with the input shaft 4 with the first carrier 1C being locked, whereby the first ring gear 1R is rotated in the reverse direction opposite to the direction of rotation of the input shaft 4, at a speed lower than the rotating speed of the input shaft 4. This reverse rotation of the first ring gear 1R is transmitted to the third ring gear 3R of the third planetary gear unit. As a result, the third sun gear 3S is rotated in the same reverse direction as the third ring gear 3R, since the third carrier 3C is connected to the output shaft 5 with a load applied to the carrier 3C. In the second planetary gear unit 2, on the other hand, the second ring gear 2R is rotated with the input shaft 4, while the second sun gear 2S fixed to the third sun gear 3S is rotated in the reverse direction, whereby the second carrier 2C and the third carrier 3C connected thereto are rotated in the forward direction, i.e., in the direction of rotation of the input shaft 4. Consequently, the output shaft 5 connected to the second and third carriers 2C, 3C is rotated in the forward direction, at a considerably reduced speed as compared with the rotating speed of the input shaft 4, i,e, at the highest speed reduction ratio among the seven forward-drive positions. The speed reduction ratio of the transmission placed in this 1st-speed position is represented by $(\rho_2-\rho_3)(\rho_3-\rho_1\rho_2)$, and its specific value in this embodiment is 3.498.

2ND-SPEED FORWARD-DRIVE POSITION

The 2nd-speed position of the gear device is established by concurrent engagement of the first and third clutches K1, K3 and the second brake B2. In other words, the shifting operation from the 1st-speed position to the 2nd-speed position requires disengagement of the first brake B1 and engagement of the second brake B2. In this condition, the first planetary gear unit 1 does not contribute to any speed reducing operation, because the first carrier 1C is released from both the input shaft 4 and the transmission casing 6. In the second planetary gear unit 2, on the other hand, the second ring gear 2R is rotated with the input shaft 4, with a load applied from the output shaft 5 to the second carrier 2C, whereby the second sun gear 2S is rotated in the reverse direction as described above. This reverse rotation of the second sun gear 2S is transmitted to the third sun gear 3S of the third planetary gear unit 3.

With the third ring gear 3R fixed to the transmission casing 6 by the second brake B2, the third carrier 3C is rotated in the forward direction when the third sun gear 3S is rotated in the reverse direction. This forward rotation of the third carrier 3C is transmitted to the second carrier 2C fixed to the third carrier 3C. In the second planetary gear unit 2, therefore, the second ring gear 2R and the input shaft 4 are concurrently rotated, and the second sun gear 2S is rotated in the reverse direction, while the second carrier 2C is rotated in the forward direction, at a relatively reduced speed as compared with the rotating speed of the input shaft 4. In short, the rotary motion of the input shaft 4 is transmitted to the output shaft 5 in the speed reduction manner in which the second and third planetary gear units 2, 3 substantially contribute to increasing the speed reduction ratio of the gear device. The speed reduction ratio provided by the gear device placed in this 2nd-speed position is represented by $(\rho_3+\rho_2)/\rho_3$, and its specific value in the present embodiment is 2.184.

3RD-SPEED FORWARD-DRIVE POSITION

The 3rd-speed position of the gear device is established by concurrent engagement of the first and third clutches K1, K3 and the third brake B3. In other words, the shifting operation from the 2nd-speed position to the 3rd-speed position requires disengagement of the second brake B2 and engagement of the third brake B3. In this condition, the first sun gear 1S is connected to the input shaft 4 for rotation as a unit, while the second and third sun gears 2S, 3S are fixed to the transmission casing 6. In this 3rd-speed position, neither the first planetary gear unit 1 nor the third planetary gear unit 3 contributes to any speed reducing operation, because the first carrier 1C is disconnected from both the input shaft 4 and the transmission casing 6, and the third ring gear 3R is disconnected from the transmission casing 6. In the second planetary gear unit 2, the second ring gear 2R is rotated with the input shaft 4 while the second sun gear 2S is locked by the third brake B3, whereby the second carrier 2C and the output shaft 5 connected to the carrier 2C is rotated in the the forward direction at a relatively reduced speed as compared with the rotating speed of the input shaft 4. The speed reduction ratio of the gear device which is placed in this 3rd-speed position is represented by $1+\rho_2$, and its specific value in the present embodiment is 1.379.

4TH-SPEED FORWARD-DRIVE POSITION

The 4th-speed position of the gear device is established by concurrent engagement of the first, second and third clutches K1, K2, K3 and disengagement of all the brakes B1, B2, B3. In other words, the shifting operation from the 3rd-speed position to the 4th-speed position requires disengagement of the third brake B3 and engagement of the second clutch K2. In this 4th-speed position, the first sun gear 1S and the first carrier 1C of the first planetary gear unit 1, and the second ring gear 2R of the second planetary gear unit 2 are all connected to the input shaft 4. As a result, the first planetary gear unit 1 as a whole is rotated in the forward direction at the same speed as the rotating speed of the input shaft 4, and the forward rotation of the first ring gear 1R is transmitted to the third ring gear 3R of the third planetary gear unit 3. Since the second and third sun gears 2S, 3S and the second and third carriers 2C, 3C are respectively fixed to each other for rotation as a unit, the whole structure of the second and third planetary gear units 2, 3 is rotated in the forward direction at the same rotating speed as the input shaft 4, when the second and third ring gears 2R, 3R are concurrently rotated with the input shaft 4. In short, the rotary motion of the input shaft 4 is directly transmitted to the output shaft 5, with the three planetary gear units 1, 2, 3 rotated as a unit. In this case, the speed reduction ration of the gear device is "1".

5TH-SPEED FORWARD-DRIVE POSITION

The 5th-speed position of the gear device is established by concurrent engagement of the second clutch K2, the third clutch K3 and the third brake B3. In other words, the shifting operation from the 4th-speed position to the 5th-speed position requires disengagement of the first clutch K1 and engagement of the third brake K3. In this condition, the first planetary gear unit 1 is adapted such that the first sun gear 1S is rotated in the forward direction at a speed higher than the rotating speed of the input shaft 4, and such that the first ring gear 1R is rotated in the forward direction at a speed lower than the input shaft 4. In the second and third planetary gear units 2, 3 in which the two carriers 2C, 3C and the two sun gears 2S, 3S are respectively fixed to each other, the second ring gear 2R is rotated in the forward direction at a speed higher than the input shaft 4, and the third ring gear 3R is rotated in the forward direction at a speed lower than the input shaft 4. Consequently, the second and third carriers 2C, 3C and the output shaft 5 connected thereto are rotated in the forward direction at a speed higher than the input shaft 4. Thus, the rotary motion of the input shaft 4 is transmitted to the output shaft 5 with the transmission placed in the 5th-speed overdrive position. The speed reduction ratio of the transmission in this position is represented by $(1+\rho_1+\rho_1\rho_2-\rho_3)/(1+\rho_1)$, and its specific value in the present embodiment is 0.848.

6TH-SPEED FORWARD-DRIVE POSITION

The 6th-speed position of the gear device is established by concurrent engagement of the first and second clutches K1, K2 and the third brake B3. In other words, the shifting operation from the 5th-speed position to the 6th-speed position requires disengagement of the third clutch K3 and engagement of the first clutch K1. Since both the first sun gear 1S and the first carrier 1C are connected to the input shaft 4 by the clutches K1, K2, the first planetary unit 1 as a whole is concurrently rotated with the input shaft 4, in the same direction (forward direction) as that of rotation of the shaft 4. As a result, the forward rotation of the first ring gear 1R is transmitted to the third ring gear 3R connected thereto. In the third planetary gear unit 3, therefore, the third ring gear 3R is rotated in the forward direction at the same speed as the input shaft 4, with the third sun gear 3S locked by the third brake B3, whereby the third carrier 3C and the output shaft 5 connected thereto are rotated in the forward direction, at a speed higher than the rotating speed of the input shaft 4. In this case, the second planetary gear unit 2 does not contributes to any speed reducing operation, because of disengagement between the second ring gear 2R and the first sun gear 1S due to release of the third clutch K3. That is, the rotary motion of the input shaft 4 is transmitted to the output shaft 5 so that the speed of rotation of the input shaft 4 is substantially increased by the third planetary gear unit 3. The speed reduction ratio of the transmission which is placed in this 6th-speed position is represented by $1-\rho_3$, and its specific value in this embodiment is 0.680.

7TH-SPEED FORWARD-DRIVE POSITION

The 7th-speed position of the gear device is established by concurrent engagement of the second clutch K2, the third clutch K3 and the second brake B2. In other words, the shifting operation from the 5th-speed position to the 7th-speed position requires disengagement of the third brake B3 and engagement of the second brake B2. In this condition, the first planetary gear unit 1 is adapted such that the first carrier 1C is rotated with the input shaft 4, with the first ring gear 1R locked by the second brake B2, whereby the first sun gear 1S is rotated in the forward direction, at a considerably increased speed as compared with the rotating speed of the input shaft 4. The high-speed forward rotation of the first sun gear 1S is transmitted to the second ring gear 2R through the third clutch K3. In the second planetary gear unit 2, on the other hand, the second sun gear 2S is rotated in the reverse direction as the second ring gear 2R is rotated in the forward direction, since a load is applied from the output shaft 5 to the second carrier 2C connected thereto. The reverse rotation of the second sun gear 2S causes the third sun gear 3S to rotate in the same reverse direction. In the third planetary gear unit 3, therefore, the third carrier 3C is rotated in the forward direction, since the third sun gear 3S is reversely rotated with the third ring gear 3R being locked by the second brake B2. Consequently, the second ring gear and carrier 2R, 2C are rotated in the forward direction, at a far higher speed than the input shaft 4, while the second sun gear 2S is rotated in the reverse direction. Thus, the output shaft 5 connected to the second and third carriers 2C, 3C is rotated in the forward direction, at a considerably increased speed as compared with the rotating speed of the input shaft 4. The speed reduction ratio of the transmission placed in this 7th-speed position is represented by $\rho_1(\rho_2+\rho_3)/\rho_3(1+\rho_1)$, and its specific value in this embodiment is 0.526.

REAR DRIVE POSITION

The rear drive position of the gear device is established by concurrent engagement of the first clutch K1, the first brake B1 and the third brake B3. More specifically, the first sun gear 1S is connected to the input shaft 4 through the first clutch K1, while the first carrier 1C, and the second and third sun gears 2S, 3S are fixed to the transmission casing 6 by the first and third brakes B1, B3. In the first planetary gear unit 1, therefore, the first sun gear 1S is rotated with the input shaft 4 with the first carrier 1C locked, whereby the first ring gear 1R is rotated in the reverse direction, at a speed lower than the rotating speed of the input shaft 4. This low-speed reverse rotation of the first ring gear 1R is transmitted to the third ring gear 3R in fixed connection with the gear 1R. Since the third ring gear 3R is reversely rotated with the third sun gear 3S locked by the brake B3, the third carrier 3C and the output shaft 5 connected thereto is rotated in the reverse direction, at a relatively low speed. In this case, the second planetary gear unit 2 does not contribute to any speed reducing operation because of disengagement between the second ring gear 2R and the first sun gear 1S. The speed reduction ratio of the transmission placed in this rear drive position is represented by $-(1-\rho_3)/\rho_1$, and its specific value in this embodiment is $-2.144$.

It will be understood from the above description that the speed reduction ratios provided by the present speed changing gear device placed in the 1st-speed position through 4th-speed position are determined so as to vary almost in the form of a geometric progression. This means that the ratio of the rotating speeds of the engine before and after each shifting operation is almost held at a constant value, permitting the automatic transmission to be smoothly and easily shifted up and down.

Further, the present gear device has the 5th- and 6th-speed positions as overdrive positions, which have respective speed reduction ratios of about 0.848 and 0.68 that are held within a practically permissible range. These overdrive positions eliminates unnecessary increase in the rotating speed of the engine during a high-speed running of the vehicle while assuring a high degree of acceleration performance, improved fuel economy and noise-free running of the vehicle.

Moreover, any shifting operation of the gear device from one of the six forward-drive positions (1st-speed through 6th-speed positions) to the adjacent forward-drive position (except for 7th-speed position) requires only disengagement of one of the six coupling devices including the clutches and brakes K1-K3, B1-B3, and engagement of another coupling device. That is, all shifting operations are effected by disengaging one of the three engaged coupling devices and engaging one of the three disengaged coupling devices. Consequently, the gear device or transmission can be smoothly and easily shifted up and down, with comparatively reduced shifting shocks. Even if the gear device is shifted from the 5th-speed position to the 7th-speed position in place of 6th-speed position, the shifting operation requires only disengagement and engagement of appropriate two coupling devices (B3 and B2).

It is also to be noted that the present speed changing gear device is comparatively simple in construction, since the gear device has only three planetary gear units 1, 2, 3, which have respective gear ratios held within a suitable range of 0.32-0.38. Accordingly, the gear device can be constructed relatively compact and small-sized, owing to sufficiently reduced radial dimensions of the three planetary gear units with the suitably determined gear ratios. Further, the relative rotating speeds of the planetary pinions 1P, 2P, 3P with respect to the carriers 1C, 2C, 3C can be sufficiently lowered.

It will be understood from the table of FIG. 1(b) that all the three planetary gear units 1, 2, 3 do not perform the speed increasing/reducing operations for all of the forward- and rear-drive positions of the transmission. That is, at least one of the planetary gear units 1, 2, 3 contributes to increasing or reducing the rotating speed of the input shaft 4, depending upon the current state of engagement and disengagement of the clutches and brakes. It follows from the above description that desired operating positions of the gear device can be established by selectively connecting the appropriate elements of the planetary gear units by engaging suitable clutch means such as the third clutch K3 when needed, rather than by fixing these elements together by means of a connecting drum, for example. In the illustrated embodiment, the first sun gear 1S of the first planetary gear unit 1 is connectable to the second ring gear 2R of the second planetary gear unit 2 by means of the third clutch K3.

Figures 2A, 2B:
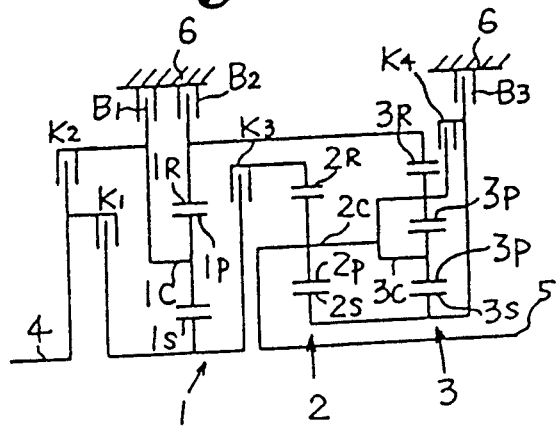

Referring to FIG. 2, a speed changing gear device shown therein has an additional fourth clutch K4, which is provided for selectively connecting the third sun gear 3S and the third carrier 3S of the third planetary gear unit. In this gear device, the second and third planetary gear units 2, 3 are rotated as a unit when the fourth clutch K4 is engaged, since the third sun gear and carrier 3S, 3C and the second sun gear and carrier 2S, 2C respectively fixed thereto are connected or united by engagement of the fourth clutch K4. As indicated in the table of FIG. 2(b), a total of seven forward-drive positions and two rear-drive positions are established by provision of the fourth clutch K4.

Figure 3:
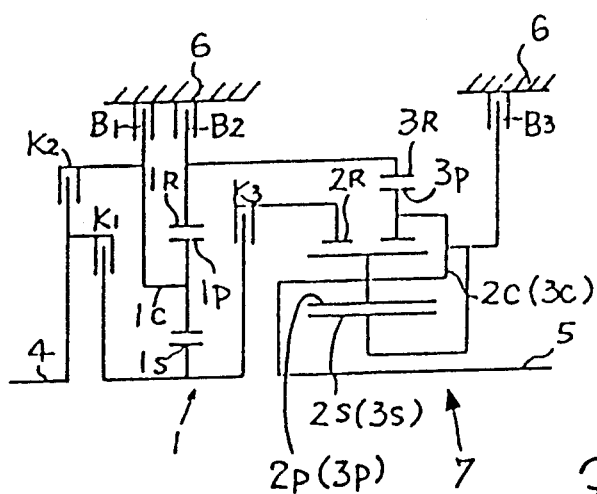

As described above, the speed changing gear device of FIG. 1(a) is constructed such that the second and third sun gears 2S, 3S and the second and third carriers 2C, 3C are respectively fixed to each other for rotation as a unit. Accordingly, the second and third planetary gear units 2, 3 may be replaced by a Ravigneaux type planetary gear assembly 7, which has a single sun gear 2S (3S), a single planetary pinion and carrier 2C (3C), and two ring gears 2R, 3R, as shown in FIG. 3. The gear device of this type operates to establish the seven forward-drive positions and one rear-drive position, according to the table of FIG. 1(b).

Figure 4:
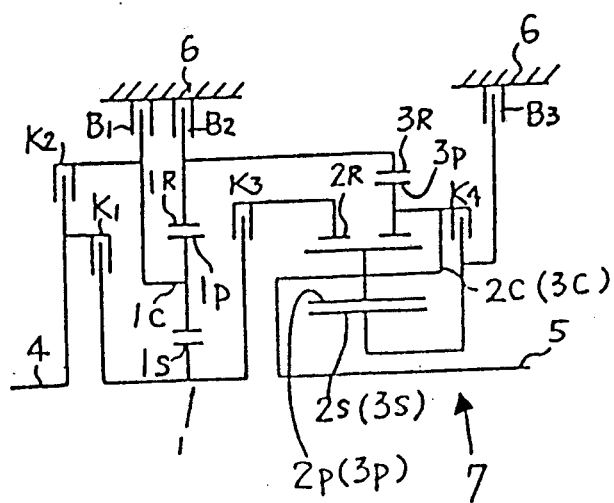

Similarly, the second and third planetary gear units 2, 3 of the speed changing gear device of FIG. 2(a) may be replaced by a Ravigneaux type planetary gear assembly 7 as used in the embodiment of FIG. 3 described just above. The thus modified gear device, which is shown in FIG. 4, operates to establish the seven forward-drive positions and two rear-drive positions, according to the table of FIG. 2(b).

In the illustrated embodiments of FIGS. 1(a) and 2(a), the third clutch K3 is provided between the first sun gear 1S and the second ring gear 2R, while the second carrier 2C is fixedly connected to the third carrier 3C. However, it is possible that the first sun gear 1S and the second ring gear 1R is fixedly connected to each other, while suitable clutch means is provided between the second and third carriers 2C, 3C. An example of this arrangement will be described, referring to FIG. 5(a).

Figures 5A, 5B:
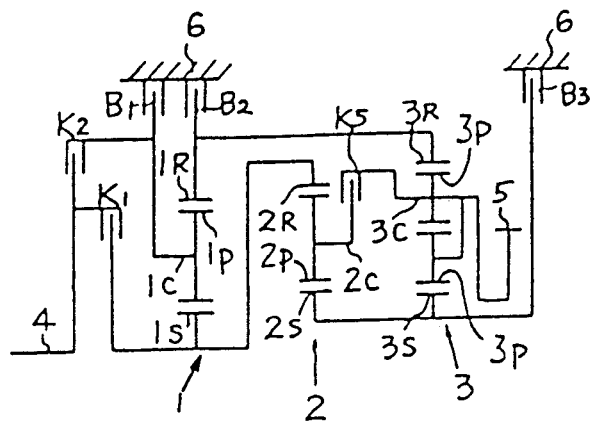

A speed changing gear device of FIG. 5(a) is a modification of the gear device of FIG. 1(a), in which the first sun gear 1S is fixed to the second ring gear 2R, and the fifth clutch K5 is provided for selectively connecting the second carrier 2C and the third carrier 3C. The thus modified gear device is adapted to establish seven forward-drive positions and one rear-drive position, according to the table of FIG. 5(b).

Figures 6A, 6B:
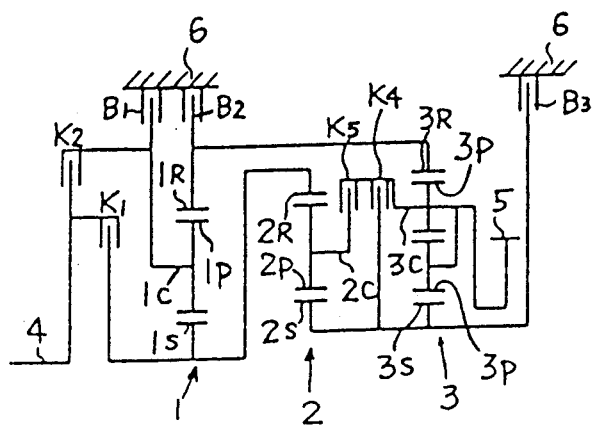

Referring to FIG. 6(a), a speed changing gear device shown therein is a modification of the gear device of FIG. 2(a), in which the first sun gear 1S and the second ring gear 2R are fixed to each other, and the fifth clutch K5 is provided for selectively connecting the second carrier 2C and the third carrier 3C. The gear device of FIG. 6(a) is adapted to establish seven forward-drive positions and two rear-drive positions, according to the table of FIG. 6(b).

The fourth clutch K4 provided in the gear devices of FIGS. 2(a), 4, 6(a) is engaged for connecting the second sun gear and carrier 2S, 2C and thereby uniting the whole structure of the second planetary gear unit 2, and for connecting the third sun gear and carrier 3S, 3C and thereby uniting the whole structure of the third planetary gear unit 3. According to the present invention, additional clutch means may be provided for uniting the whole structure of the first planetary gear unit 1.

Figures 7A, 7B:
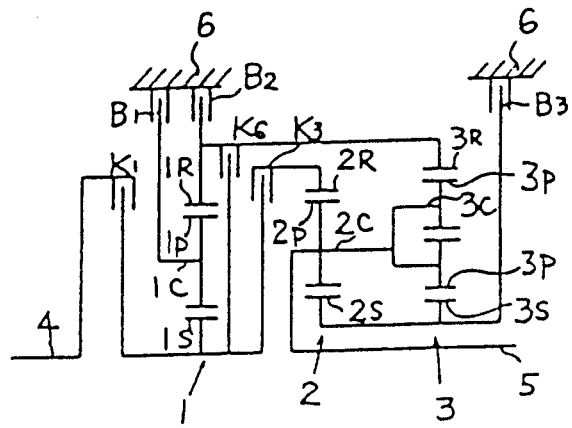

Referring to FIG. 7(a), a speed changing gear device shown therein is a modification of the gear device of FIG. 1(a), which has an additional sixth clutch K6 provided for selectively connecting the first sun gear 1S and the first ring gear 1R. Since the whole structure of the first planetary gear unit 1 can be integrated by engagement of the sixth clutch K6, the second clutch K2 provided between the input shaft 4 and the first carrier 1C is eliminated. The gear device of FIG. 7(a) is adapted to establish five forward-drive positions and one rear-drive position, by concurrently engaging three coupling devices selected from among the three clutches K1, K3, K6 and the three brakes B1–B3, according to the table of FIG. 7(b).

Figures 8A, 8B:
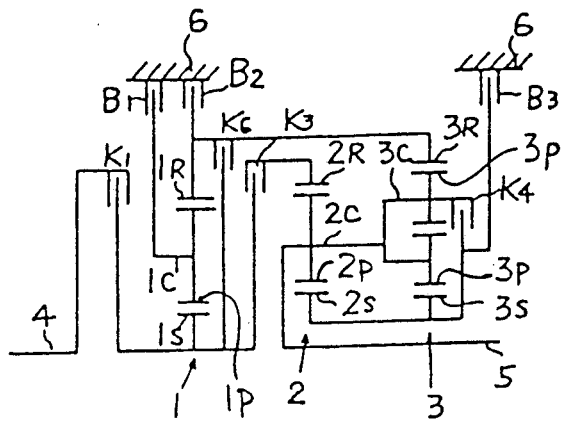

A speed changing gear device shown in FIG. 8(a) is a modification of the gear device of FIG. 2(a), which has the sixth clutch K6 provided for selectively connecting the first sun gear 1S and the first ring gear 1R. In this arrangement, the second clutch K2 is eliminated, and the location of the fourth clutch K4 is changed so that the third sun gear 3S and the third carrier 3C are connectable to each other by the fourth clutch K4. The gear device of FIG. 8(a) provides five forward-drive positions and two rear-drive positions, which are established by concurrent engagement of three coupling devices selected from among the four clutches K1, K3, K4, K6 and the three brakes B1, B2, B3, according to the table of FIG. 8(b).

Figures 9A, 9B:
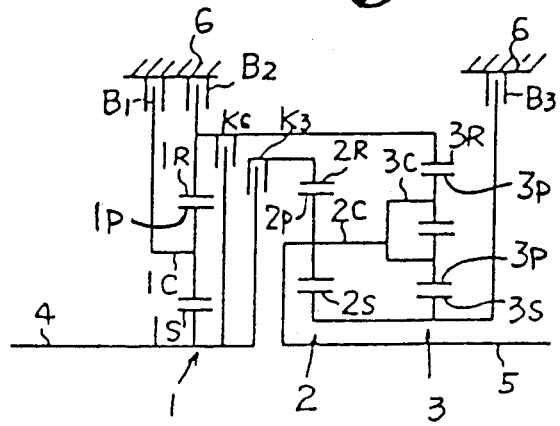

It will be understood from the tables of FIG. 7(b) and 8(b) that the first clutch K1 of each speed changing gear device of FIGS. 7(a) and 8(a) is engaged for all of the forward- and rear-drive positions. Therefore, it is possible to eliminate the first clutch K1 of these gear devices by fixing the input shaft 4 to the first sun gear 1S of the first planetary gear unit 1. A speed changing gear device shown in FIG. 9(a) is a modification of the gear device of FIG. 7(a), in which the first clutch K1 is eliminated by fixing the first sun gear 1S and the input shaft 4 to each other. As indicated in the table of FIG. 9(b), the gear device of FIG. 9(a) provides five forward-drive positions and one rear-drive position, which are established by concurrent engagement of two coupling devices selected from among the two clutches K3, K6 and the three brakes B1-B3.

Figures 10A, 10B:
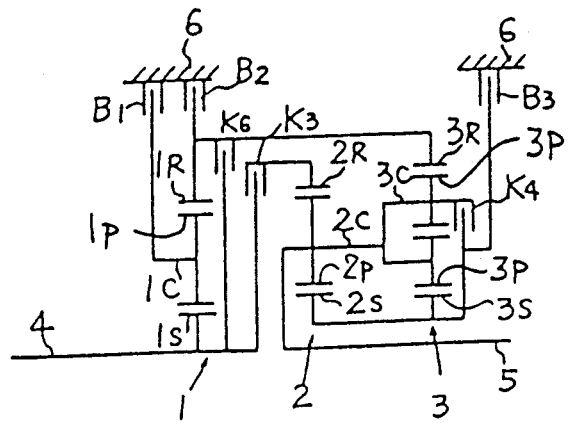

Referring next to FIG. 10(a), a speed changing gear device shown therein is a modification of the gear device of FIG. 8(a), in which the first clutch K1 is eliminated by fixing the first sun gear 1S and the input shaft 4 to each other. As indicated in the table of FIG. 10(b), five forward-drive positions and two rear-drive positions are established by concurrent engagement of two coupling devices selected from among the three clutches K3, K4, K6 and the three brakes B1-B3.

The speed changing gear device of FIG. 5(a) is provided as a modification of the gear device of FIG. 1(a), by eliminating the third clutch K3 of the gear device of FIG. 1(a), and adding the fifth clutch K5 for selective connection between the second and third carriers 2C, 3C. The speed changing gear device of FIG. 6(a) is provided by modifying the gear device of FIG. 2(a) in the same manner as described above. This modification in which the third clutch K3 is replaced by the fifth clutch K5 may be applied to the gear devices of FIGS. 7(a) and 8(a).

Figures 11A, 11B:
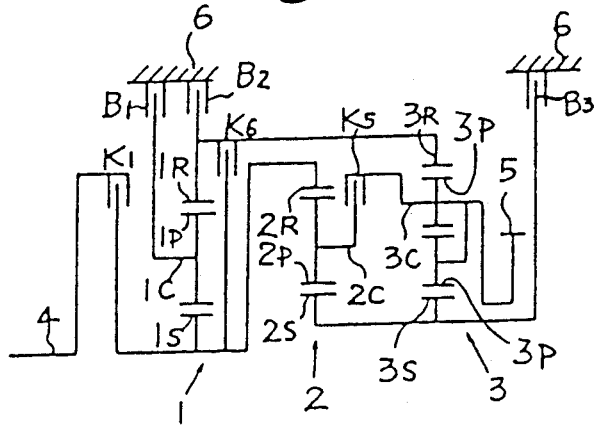

A speed changing gear device shown in FIG. 11(a) is a modification of FIG. 7(a), in which the third clutch K3 is eliminated by fixing the first sun gear 1S and the second ring gear 2R to each other, and which has the fifth clutch K5 provided for selectively connecting the second and third carriers 2C, 3C. This gear device having the three clutches K1, K5, K6 and the three brakes B1-B3 is adapted to establish five forward-drive positions and one rear-drive position, according to the table of FIG. 11(b).

Figures 12A, 12B:
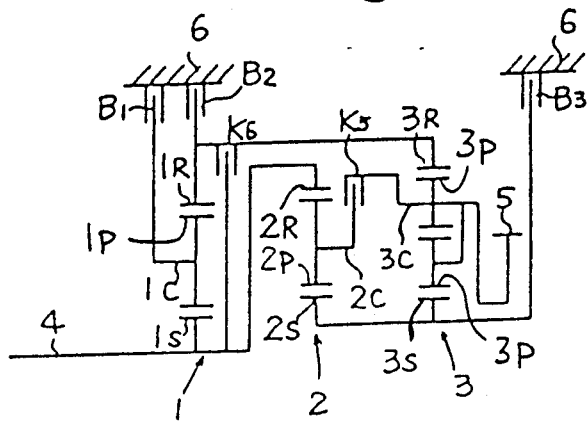

In the gear device of FIG. 11(a), the first clutch K1 is engaged for establishing all of the operating positions of the gear device, as shown in the table of FIG. 11(b). Accordingly, it is possible to eliminate the first clutch K1 by fixing the input shaft 4 to the first sun gear 1S. This arrangement is illustrated in FIG. 12(a). The gear device of FIG. 12(a) having the two clutches K5, K6 and the three brakes B1-B3 operates to establish five forward-drive positions and one rear-drive position, according to the table of FIG. 12(b).

Figures 13A, 13B:
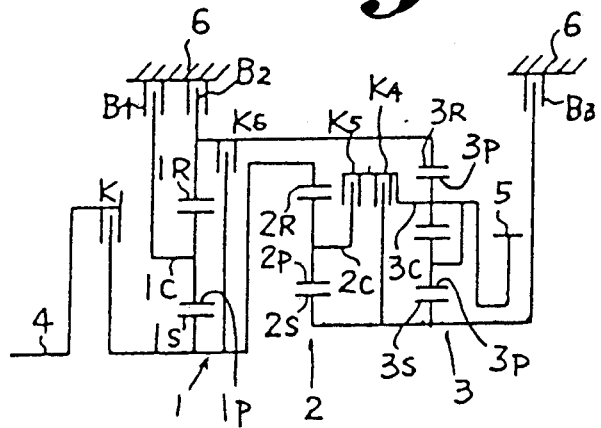

A speed changing gear device shown in FIG. 13(a) is a modification of the gear device of FIG. 8(a), in which the third clutch K3 is eliminated by fixing the first sun gear 1S and the second ring gear 2R to each other, and which has the fifth clutch K5 provided for selective connection between the second and third carriers 2C, 3C. As indicated in FIG. 13(b), five forward-drive positions and two rear-drive positions are established by concurrent engagement of three coupling devices selected from among the four clutches K1, K4, K5, K6 and the three brakes B1-B3.

Figures 14A, 14B:
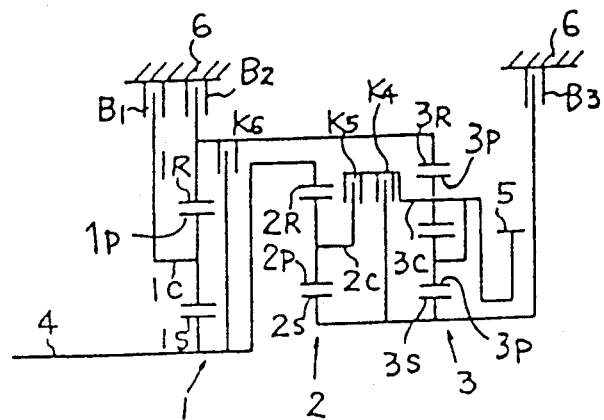

In the gear device of FIG. 13(a), the first clutch K1 is engaged for establishing all of the operating positions of the gear device. Therefore, the first clutch K1 may be eliminated by fixing the input shaft 4 to the first sun gear 1S. This arrangement illustrated in FIG. 14(a) can provide the same operating positions as the gear device of FIG. 13(a), by selectively engaging and disengaging the three clutches K4, K5, K6 and the three brakes B1-B3 as indicated in FIG. 14(b).

Each of the clutches K1, K2, K3, K4, K5, K6 used in the various embodiments discussed above is provided by a multiple-disk type clutch. However, a one-way clutch or a multiple-disk clutch in combination with a one-way clutch may be used for clutch means, for improved fuel economy and noise-free running of the vehicle and reduced shifting shocks. Each of the brakes B1, B2, B3 used in the various embodiments discussed above is provided by a multiple-disk type brake. However, a one-way clutch, a band brake, or a combination thereof may be used for brake means in place of the multiple-disk brake. Typical examples of these clutches and brakes are disclosed in Japanese Patent Applications Nos. 63-1767270 and 63-221670.

While the present invention has been described in its presently preferred embodiments with a certain degree of particularly, for illustrative purpose only, it is to be understood that the invention may be embodied with various other changes, modifications and improvements, which may occur to those skilled in the art, in the light of the foregoing teaching. For example, the two elements of each combination of the planetary gear units as defined in the appended claims may be fixed to each other, or selectively connectable to each other by clutch means. Further, the elements to be connected to the input and output shafts, and the element(s) to be fixed to the transmission casing may be suitably determined.

What is claimed is:

1. A speed changing gear device in an automatic transmission for a motor vehicle, including a first single-pinion planetary gear unit having a first sun gear, a first planetary pinion meshing with the first sun gear, a first ring gear meshing with the first planetary pinion and a first carrier rotatably supporting the first planetary pinion, a second single-pinion planetary gear unit having a second sun gear, a second planetary pinion meshing with the second sun gear, a second ring gear meshing with the second planetary pinion and a second carrier rotatably supporting the second planetary pinion, and a third double-pinion type planetary gear unit having a third sun gear, at least one pair of third planetary pinions which mesh with each other and one of which meshes with the third sun gear, a third ring gear meshing with the other of said at least one pair of third planetary pinions, and a third carrier rotatably supporting said at least one pair of third planetary pinions, said first, second and third planetary gear units being disposed coaxially with each other in the other of description, for transmitting power from an input member to an output member, at a selected one of different speed reduction ratios, wherein the improvement comprises;

said first and third ring gears being associated with each other by fixing means for fixing said first and third ring gears to each other;

said first sun gear and said second ring gear being associated with each other, by one of fixing means for fixing said first sun gear and said second ring gear to each other, or clutch means for selectively connecting said first sun gear and said second ring gear to each other;

said second and third carriers being associated with each other by fixing means for fixing said second and third carriers to each other; and said second and third sungears being associated with each other by fixing means for fixing said second and third sun gears to each other.

2. A speed changing gear device according to claim 1, wherein said fist sun gear and said second ring gear are connectable to each other by clutch means, and said second and third carriers are fixed to each other for rotation as a unit.

3. A speed changing gear device according to claim 2, wherein three clutches including a clutch as said clutch means are provided in combination with three brakes, each of said different speed reduction ratios being provided by concurrent engagement o three members selected from among said three clutches and aid three brakes.

4. A speed changing gear device according to claim 2, wherein said output member and said second carrier are fixed to each other for rotation as a unit.

* * * * *